(12) United States Patent
Fujita et al.

(10) Patent No.: US 7,892,697 B2
(45) Date of Patent: Feb. 22, 2011

(54) LIQUID TANK AND FUEL CELL SYSTEM WITH FUEL MONITORING

(75) Inventors: Goro Fujita, Ota (JP); Hiroshi Kurokawa, Yawata (JP); Takashi Yasuo, Ashikaga (JP)

(73) Assignee: Sanyo Electric Co., Ltd., Osaka (JP)

( * ) Notice: Subject to any disclaimer, the term of this patent is extended or adjusted under 35 U.S.C. 154(b) by 1356 days.

(21) Appl. No.: 11/399,503

(22) Filed: Apr. 7, 2006

(65) Prior Publication Data
US 2006/0228595 A1 Oct. 12, 2006

(30) Foreign Application Priority Data

Apr. 8, 2005 (JP) ............... 2005-112259
Mar. 27, 2006 (JP) ............... 2006-084842

(51) Int. Cl.
*H01M 8/04* (2006.01)
(52) U.S. Cl. ............ 429/513; 429/515; 429/444; 429/447
(58) Field of Classification Search ........... 429/34, 429/32, 30, 9, 22, 23; 220/592, 4.12, 23.86, 220/501, 502, 255, 260; 137/262, 264, 265, 137/393
See application file for complete search history.

(56) References Cited

U.S. PATENT DOCUMENTS

2005/0074656 A1* 4/2005 Koyama et al. ............ 429/34
2009/0186257 A1* 7/2009 Sakai et al. ............ 429/34

FOREIGN PATENT DOCUMENTS

JP 2003-304972 A 10/2003
JP 2004-127905 4/2004

OTHER PUBLICATIONS

Chinese Office Action with English Translation, issued in corresponding Chinese Patent Application No. 200610074322.6, dated on Aug. 31, 2007.

* cited by examiner

*Primary Examiner*—Raymond Alejandro
(74) *Attorney, Agent, or Firm*—McDermott Will & Emery LLP

(57) ABSTRACT

A fuel cell system includes a fuel cell provided with an anode and a cathode, a first container for storing a liquid fuel to be supplied to the anode, a second container provided in the first container to contain liquid and gas, a joint which is provided in the first container and discharges the liquid fuel outside the first container, an outlet pipe connecting the joint to the second container, and a remaining indicator window provided to make the interior of the outlet pipe is viewable. Further, an alert color is applied to an area that becomes viewable when the gas is flowing through the outlet pipe, the color being applied on the area opposite to the remaining indicator window across the outlet pipe.

18 Claims, 15 Drawing Sheets

GAS    LIQUID

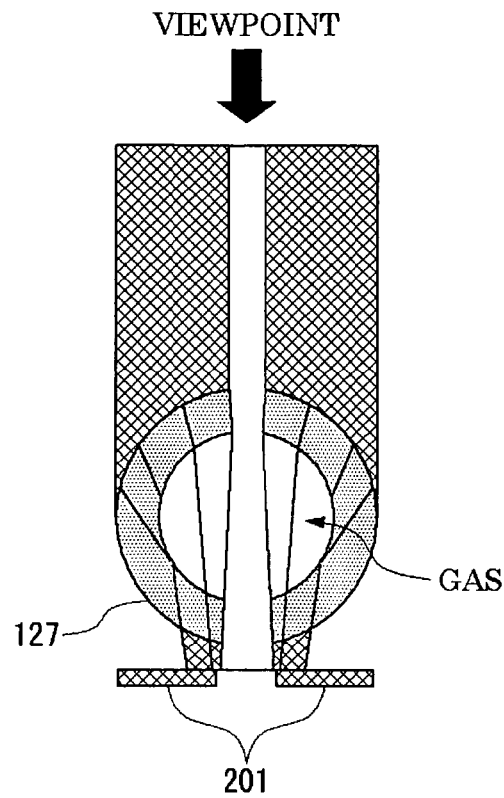
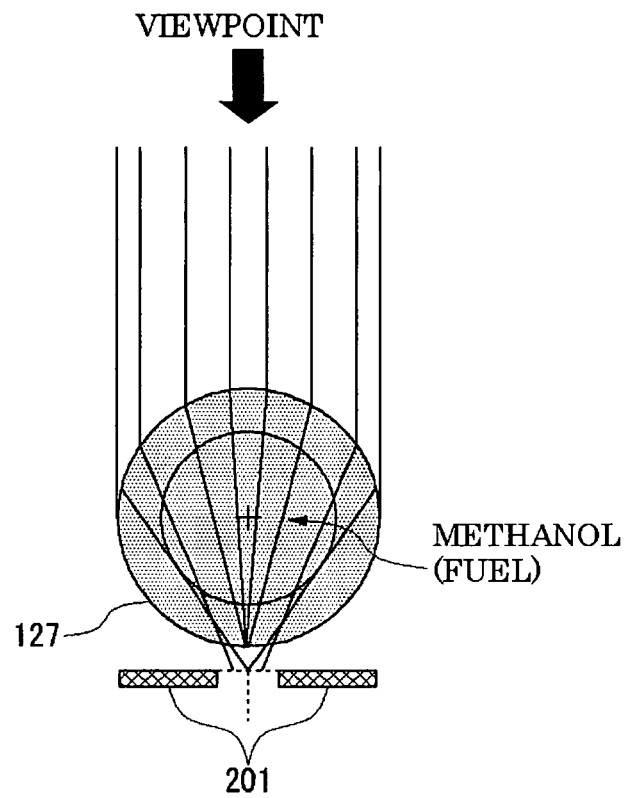
FIG.13A  FIG.13B
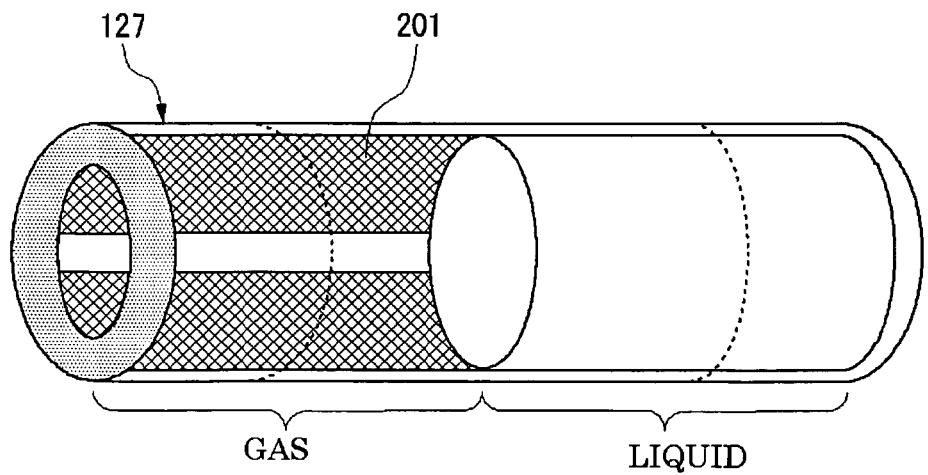
FIG.13C

LIQUID TANK AND FUEL CELL SYSTEM WITH FUEL MONITORING

BACKGROUND OF THE INVENTION

1. Field of the Invention

The present invention relates to a liquid tank and a fuel cell system and, more specifically, to a liquid tank (fuel tank) and a fuel cell system provided with such a tank, in which it is easy to monitor the remaining quantity of liquid fuel.

2. Description of the Related Art

A fuel cell is a device that generates electricity from hydrogen and oxygen and achieves highly efficient power generation. Unlike conventional power generation, a fuel cell allows direct power generation that does not require conversion into thermal energy or kinetic energy. As such, even a small-scale fuel cell achieves highly efficient power generation. Other features unique to a fuel cell include less emission of nitrogen compounds, etc. and environmental benefits due to small noise and vibration. As described, a fuel cell is capable of efficiently utilizing chemical energy in fuel and as such environmentally friendly. Fuel cells are envisaged as an energy supply system for the twenty-first century and have gained attention as a promising power generation system that can be used in a variety of applications including space applications, automobiles, mobile appliances and large and small scale power generation. Serious technical efforts are being made to develop practical fuel cells.

Of various types of fuel cells, a solid polymer fuel cell is unique in its low operating temperature and high output density. Recently, direct methanol fuel cells (DMFC) are especially highlighted. In a DMFC, methanol water solution as a fuel is not reformed and is directly supplied to an anode so that electricity is produced by an electrochemical reaction induced between the methanol water solution and oxygen. Reaction products resulting from the electrochemical reaction are carbon dioxide being emitted from an anode and generated water emitted from a cathode. Methanol water solution is richer in energy per unit area than hydrogen. Moreover, it is suitable for storage and poses little danger of explosion. Accordingly, it is expected that methanol water solution will be used in power supplies for automobiles, mobile appliances (cell phones, notebook personal computers, PDAs, MP3 players, digital cameras, electronic dictionaries (books)) and the like.

When a DMFC generates power, fuel is consumed. Thus, a DMFC system that uses a DMFC is supplied with fuel from a fuel tank which is detachable from the DMFC system and which is filled by pure methanol or highly-concentrated methanol water solution. When fuel in a fuel tank is exhausted, the fuel tank is replaced.

[Patent document No. 1]

JP 2004-127905 A

Conventional DMFC systems are designed to detect an empty fuel tank and suspension of the supply of fuel from the fuel tank to the DMFC system and notify a user that the fuel in the fuel tank is exhausted. Another conventional approach is for a DMFC system controller to calculate the total power generated since the fuel tank is attached so as to estimate fuel consumption from the total generated power. The user is alerted when it is desirable to replace a fuel tank.

Meanwhile, such a DMFC system requires complex measures for detecting an empty tank or detecting the remaining quantity.

SUMMARY OF THE INVENTION

Accordingly, a general purpose of the present invention is to provide a liquid tank and a fuel cell system provided with such a tank, in which it is easy to monitor the remaining quantity of fuel (liquid).

A liquid tank in one embodiment of the present invention comprises: a first container; a second container provided in the first container to contain liquid and gas; an outlet which is provided in the first container and discharges liquid outside the first container; a connecting pipe which connects the outlet to the second container; and a viewer provided to make the interior of the connecting pipe viewable.

With this tank, it is easy to know that the liquid in the second container is running out by observing an interface between liquid phase and gas phase in the connecting pipe. Therefore, it is preferable that the connecting pipe be made of a material which is not nontransparent. The first container is preferably made of a rigid material and the second container is preferably made of a flexible, pliable and elastic material, to allow for requirements for ease of handling and rigidity of the liquid tank.

The connecting pipe may at least comprise: a liquid outlet which is joined to the second container and drains the liquid from the second container; and a light permeable portion provided adjacent to the viewer and allowing the interior of the connecting pipe to be viewable, wherein, when the liquid tank is installed in its place, the liquid outlet may be located in the lower part of the liquid tank and the light permeable portion may be provided in the upper part of the liquid tank.

The connecting pipe may be made of a transparent material, a guide object may be provided opposite to the viewer across the connecting pipe so as to improve viewability of the interior of the connecting pipe, and the apparent size of the guide object as viewed through the viewer may differ depending on whether the liquid is flowing through the connecting pipe or the gas is flowing through the connecting pipe, due to a difference in associated refractive indexes inside the connecting pipe. According to this embodiment, it is possible to know whether liquid is flowing through the connecting pipe or gas is flowing, in accordance with a difference in apparent sizes of the guide object as viewed through the connecting pipe.

A plurality of liquid indicator areas may be provided at predetermined intervals around the circumference of the connecting pipe. According to this embodiment, a more extensive viewing range is ensured in which it is possible to know whether liquid is in the connecting pipe.

An alert color may be applied to an area in the guide object that becomes viewable only when the gas is flowing through the connecting pipe. According to this embodiment, the apparent color of the connecting pipe turns into the alert color when the gas is flowing through the connecting pipe, allowing immediate visual confirmation that fuel is running out.

Character information indicating that the liquid in the second container is exhausted may be applied to an area in the guide object that becomes viewable only when the gas is flowing through the connecting pipe. According to this embodiment, character information indicating that the liquid is running out is clearly viewable through the connecting pipe when the gas is flowing through the connecting pipe. Therefore, users can know that fuel is running out more properly.

The outlet may be located in the lower part of the liquid tank when the liquid tank is installed in its place.

The term "installed in its place" means a condition in which the surface of the liquid tank designated by a tank designer as the bottom surface lies on, for example, a desk, or a condition in which the designated surface lies closer to the desk surface than the other surfaces of the liquid tank. The term "upper part of the liquid tank" refers to a part above the middle of the liquid tank and the term "lower part" refers to a part below the middle, where being "below" is defined as being in the direction of gravitation pull and being "above" is defined as being in the opposite direction. According to this arrangement, the gas filling the second container is drawn via the liquid outlet after the liquid.

The gas may be an inactive gas, and the liquid may be alcohol. The liquid may be liquid fuel supplied to a fuel cell.

The term "inactive gas" refers to a gas having a low chemical reactivity such as helium, nitrogen, argon. The term "alcohol" refers to a chemical compound obtained by replacing hydrogen atoms in chain hydrocarbon or alicyclic hydrocarbon by hydroxyl groups. Typical alcohols include methylalcohol (methanol), ethyl alcohol (ethanol), ethylene glycol and glycerine. Liquid fuel used in a fuel cell may be ethanol, isopropyl alcohol, ethylene glycol, dimethyl ether, instead of methanol. If the gas filling the second container is inactive gas such as nitrogen and argon, no reaction is induced between the gas and the liquid filling the container. Therefore, safety is ensured.

A fuel cell system according to an embodiment of the present invention comprises: a fuel cell assembly which includes a fuel cell supplied with liquid fuel; and the aforementioned liquid tank detachably provided in the fuel cell assembly. According to this embodiment, the remaining quantity of liquid fuel in a fuel cell system is easily monitored.

The fuel cell system may comprise: a fuel cell unit which includes the fuel cell assembly and the aforementioned liquid tank; and a controller detachably provided in the fuel cell unit, wherein power is selectively supplied to a plurality of electronic appliances by replacing the controller depending on the electronic appliance coupled to the fuel cell system.

The fuel cell system may further comprise a seat on which the electronic appliances of different shapes are selectively mounted. The fuel cell system may further comprise a secondary battery slot which supports a secondary battery, wherein the fuel cell system is capable of charging the secondary battery.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 12A is a schematic view showing an optical path in the cross section of an outlet pipe filled with gas, FIG. 12 is a schematic view showing an optical path in the cross section of an outlet pipe filled with liquid, and FIG. 12C is a schematic view showing an interface between liquid and gas in the outlet pipe as viewed through a remaining indicator window;

FIGS. 13A-13C show a third specific embodiment for improvement of viewability of remaining fuel quantity, where FIG. 13A is a schematic view showing an optical path in the cross section of an outlet pipe filled with gas, FIG. 13B is a schematic view showing an optical path in the cross section of an outlet pipe filled with liquid, and FIG. 13C is a schematic view showing an interface between liquid and gas in the outlet pipe as viewed through a remaining indicator window;

FIG. 14A is a schematic view showing an optical path in the cross section of an outlet pipe filled with gas, FIG. 14B is a schematic view showing an optical path in the cross section of an outlet pipe filled with liquid, and FIG. 14C is a schematic view showing an interface between liquid and gas in the outlet pipe as viewed through a remaining indicator window.

DETAILED DESCRIPTION OF THE INVENTION

The invention will now be described by reference to the preferred embodiments. This does not intend to limit the scope of the present invention, but to exemplify the invention.

A detailed description will now be given of a fuel cell system 100 according to one mode of carrying out the present invention.

Figure 1:
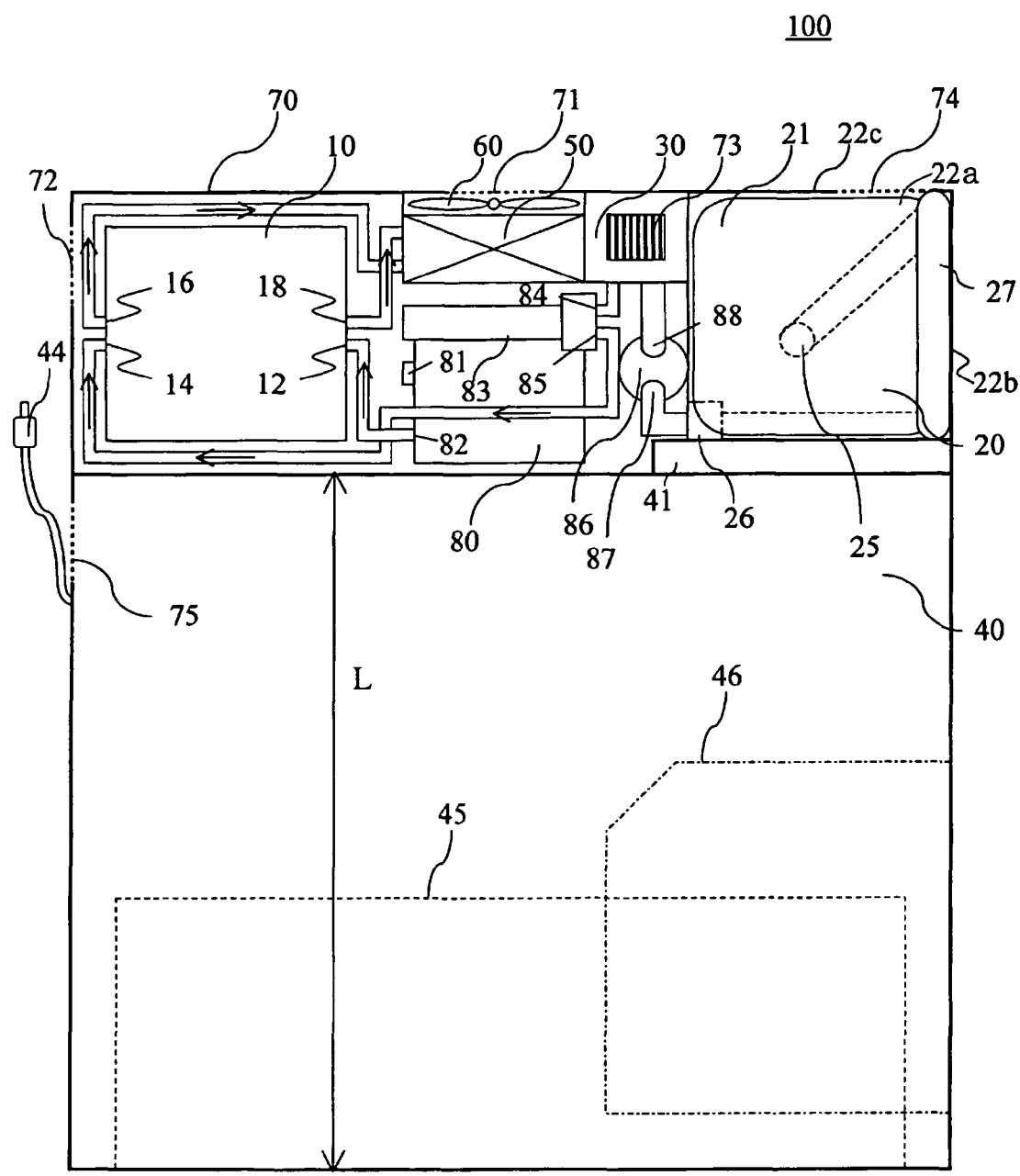
FIG. 1 is a schematic view of the structure of a fuel cell system according to the present invention.

FIG. 1 is a schematic top view showing the structure of the fuel cell system 100. The fuel cell system 100 comprises: a DMFC 10 which generates electric power when an anode is supplied with methanol water solution or pure methanol; a methanol tank 20 which contains pure methanol or highly-concentrated methanol water solution of 16 mol/L or greater, a buffer tank 30 which stores diluted methanol water solution (fuel) for supply to the DMFC 10; a controller 40 which controls an electric power conversion system and auxiliary machinery; a heat exchanger 50; an axial fan 60 and a housing 70. The diluted methanol water solution is obtained by diluting methanol from the methanol tank 20 to a concentration of about 0.1-2.0 mol/L.

Highly-concentrated methanol water solution or pure methanol may be supplied from the methanol tank 20 to the buffer tank 30 periodically. Alternatively, methanol solution or pure methanol may be supplied when the concentration of methanol water solution in the buffer tank 30 as monitored falls below a predetermined threshold level (e.g. 1.0 mol/L). A pack 21 formed of a material which is flexible and resistant to methanol (alcohol) is accommodated in the methanol tank 20. For flexibility and methanol resistance, the pack 21 may of a two-layer structure comprising polyethylene or teflon (TM) in the underlying layer and synthetic fiber such as nylon in the top layer to reinforce the pack 21. A wall 22 (comprising a flat surface 22a, a lateral surface 22b and a back surface 22c) of the methanol tank 20 constitutes a part of the housing 70. An air hole 74 provided in the back surface 22c is for preventing pressure difference from being developed between a space outside the fuel cell system 100 and a space which is inside the methanol tank 20 and which is outside the pack 21 when the volume of the pack 21 is reduced as a result of methanol in the methanol tank 20 being consumed. The air hole 74 also functions as a slip stopper when the methanol tank 20 is attached to or detached from the fuel cell system 100. The bottom of the pack 21 is provided with a methanol outlet 25. An outlet pipe 27 connects the methanol outlet 25 to a joint 26. The outlet pipe 27 is a transparent pipe thicker than the pack 21. The outlet pipe 27 is suitably made of silicon rubber and the joint 26 is suitably made of polypropylene.

Above the buffer tank 30, the housing 70 is provided with an air hole 73. The buffer tank 30 is used as a gas-liquid separator for separating between air, generated water, methanol water solution and carbon dioxide which are fully cooled by the heat exchanger 50 before flowing into the buffer tank 30, as well as being used as a diluting tank for diluting methanol from the methanol tank 20 to a predefined concentration (1.2±0.3 mol/L in this embodiment). That is, the buffer tank 30 discharges gas phase air and carbon dioxide from the air hole 73. The air hole 73 is provided with a filter (not shown). By-products such as formic acid and formic aldehyde are adsorbed by the filter as air and carbon dioxide are discharged from the air hole 73.

Air (oxidant) is supplied from an air pump 80 to the cathode of the DMFC 10. Methanol water solution is supplied from the buffer tank 30 to the anode via a first liquid pump 83. An air inlet 81 of the air pump 80 is provided at the center of the fuel cell system 100. Air taken in via the air inlet 81 of the air pump 80 is delivered to a cathode port 12 of the DMFC 10 via an air outlet 82. The first liquid pump 83 takes in methanol water solution diluted to a concentration of about 1.2 mol/L from the buffer tank 30 via a liquid inlet 84. The first liquid pump 83 delivers the solution to an anode port 14 via a liquid outlet 85. A second liquid pump 86 takes in highly-concentrated methanol water solution or pure methanol from the methanol tank 20 via a liquid inlet 87 and supplies it to the buffer tank 30 either periodically or when the methanol concentration in the buffer tank 30 falls below a predefined threshold level.

Air and generated water from the cathode of the DMFC 10 are discharged from a cathode exit 16. Methanol water solution and carbon dioxide from the anode of the DMFC 10 are discharged from an anode exit 18. The emission from the cathode exit 16 and the anode exit 18 is introduced into the heat exchanger 50 so that the mixture enters the buffer tank 30. Air at a temperature lower than the operating temperature of the DMFC 10 (60±3° C.) by 5-15° C. is supplied to the air inlet 81 and the heat exchanger 50. Accordingly, air, generated water, methanol water solution and carbon dioxide at a temperature of about 70° C. discharged from the DMFC 10 are fully compressed by the heat exchanger 50 so that there is no need to replenish water. This prevents the methanol consumption from being increased as a result of methanol being expelled outside.

Electric power generation in the DMFC is an exoergic reaction. Therefore, the temperature of the DMFC 10 is increased by supplying air and methanol water solution to the DMFC 10. To address this, a thermistor or a limiter (not shown) is fitted to the DMFC 10. The axial fan 60 is started when the temperature of the DMFC 10 approaches a temperature (55° C. in the case of this embodiment) lower than the operating temperature of the DMFC 10 (60±3° C.) by about 5° C. An air hole 71 is provided at a position in the housing 70 opposite to the axial fan 60. An air hole 72 is provided at the end of air flow around the DMFC 10. When the axial fan 60 is started, air flows around the DMFC 10 so as to cool it. With this, the temperature of the DMFC 10 is maintained at 60±3° C. A remaining indicator window 24 is provided in the methanol tank 20.

Figure 2:
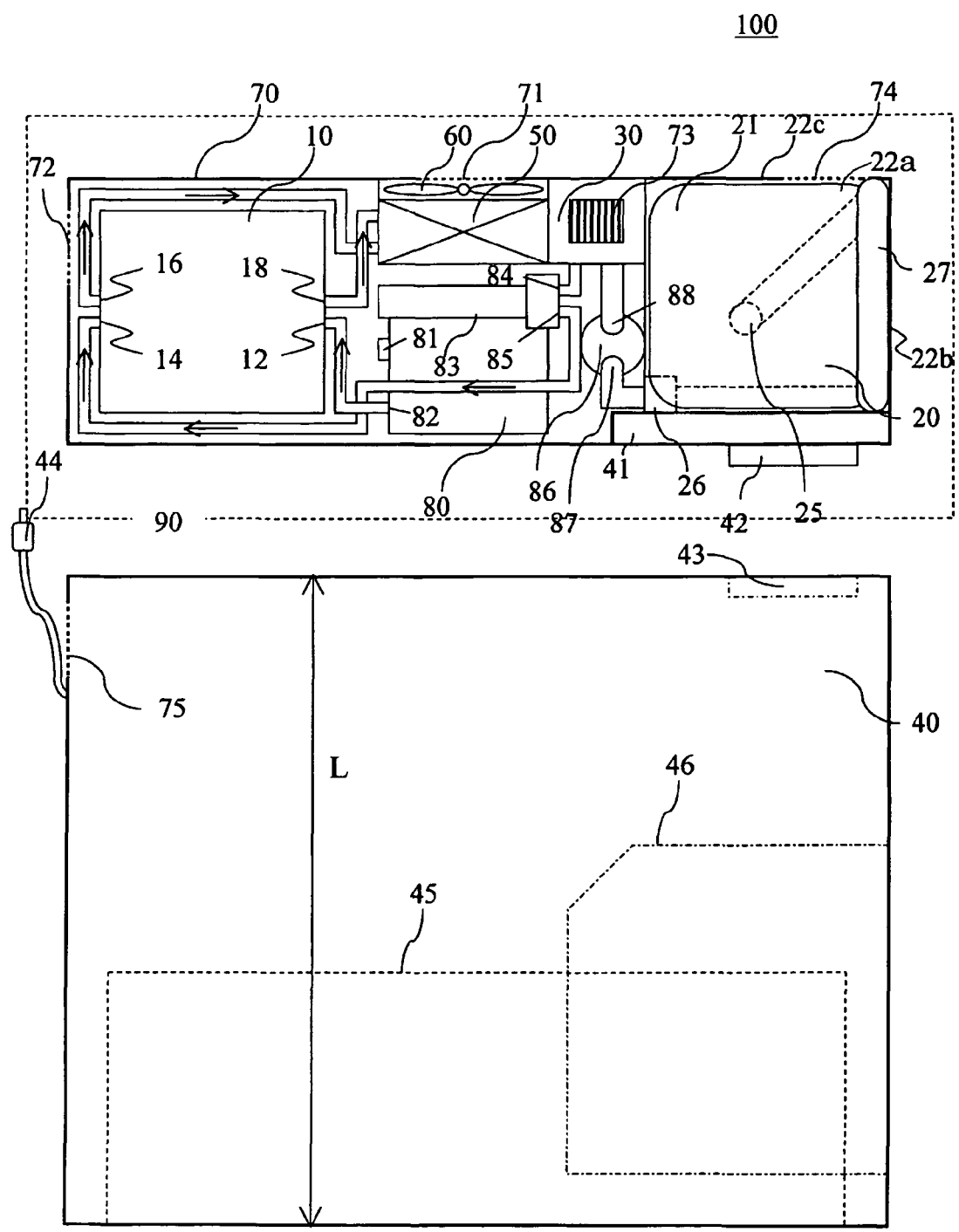
FIG. 2 is schematic view of the structure of the fuel cell system according to the present invention, showing that a fuel cell unit and a controller are separated.
Figure 3:
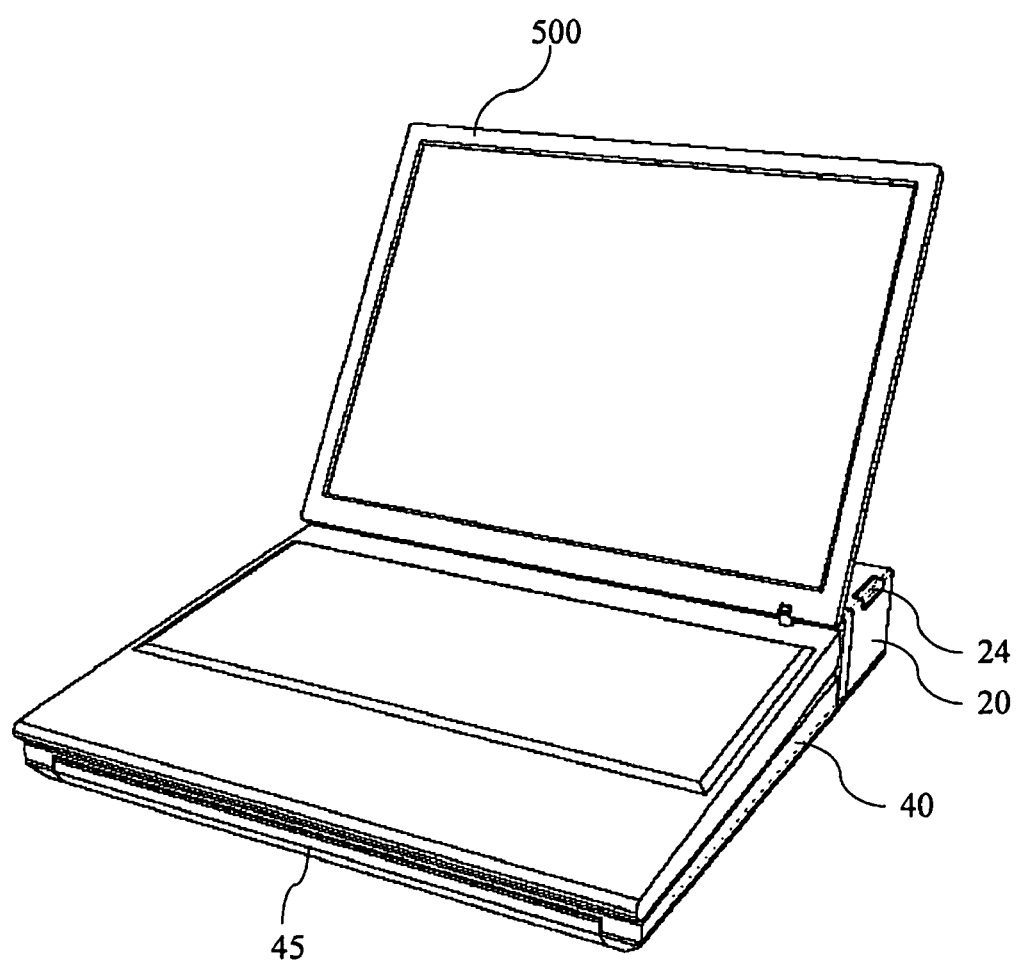
FIG. 3 is a front perspective view showing the fuel cell system according to the present invention attached to a notebook personal computer.

As shown in FIG. 2, the controller 40 is configured to be separable from a fuel cell unit 90. A communicator 41 electrically connects the fuel cell unit 90 to the controller 40. The communicator 41 is hermetically sealed inside the fuel cell unit 90 so that vapor or the like does not enter or leave the communicator 41. The communicator 41 is enabled to communicate with and exchange electric power with the controller 40 via a connector 42. The connector 42 is operably inserted into a slot 43 in the controller 40. The controller 40 may be replaced depending on the target of power supply from the fuel cell system 100. In the case of this embodiment, the notebook PC 500 is supplied electric power by mounting the notebook PC 500 face up on the controller 40 and inserting a power cable 44 to a power socket of the notebook PC 500, as shown in FIG. 3.

Figure 4:
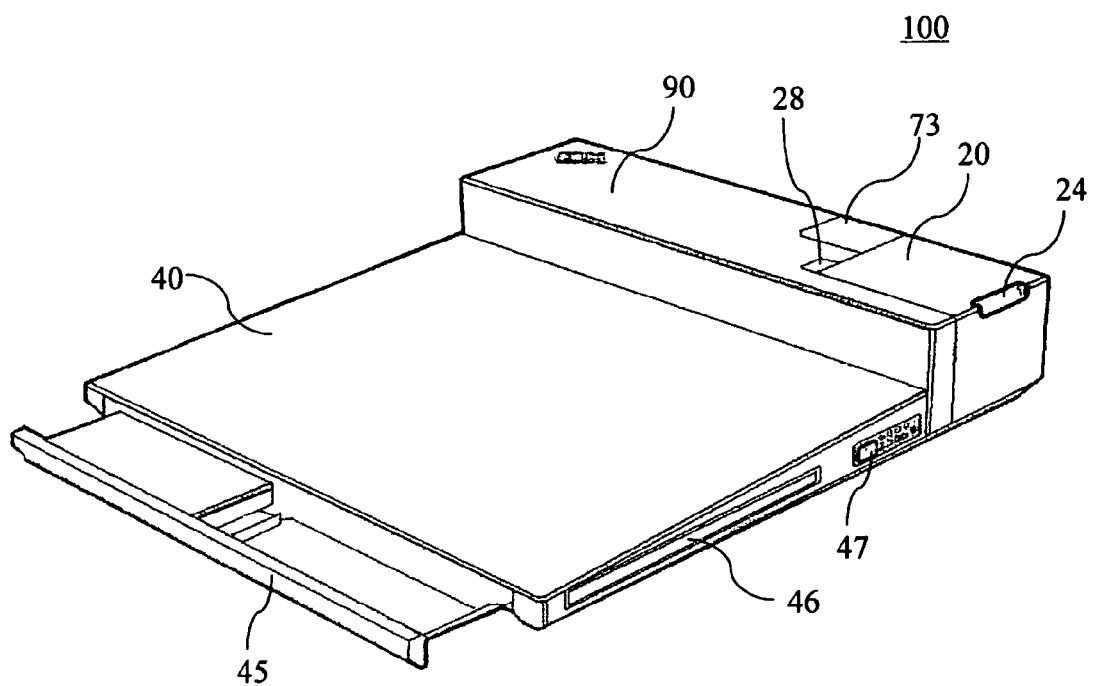
FIG. 4 is a front perspective view showing how a slidable supporter for the fuel cell system according to the present invention is drawn.

When the notebook PC 500 is larger than the controller 40 (especially when the length L is comparatively larger), or when the power socket of the notebook PC 500 is provided on the back of the notebook PC instead of on the side, a gap may be created between the bottom of the PC and the controller 40, resulting in the notebook PC 500 being mounted in an unstable manner. In such a case, as shown in FIG. 4, a slidable supporter 45 is drawn toward a user so that the notebook PC 500 is properly supported. A power switch 47 of the fuel cell system 100 is turned on to start the fuel cell system 100 for supply of electric power from the fuel cell system 100 to a target of power supply such as the notebook PC 500. A lock release button 28 releases the methanol tank 20 from the fuel cell system 100.

By configuring the fuel cell unit 90 and the controller 40 to be separable, or by configuring the controller 40 to be replaceable depending on a target of power supply, it is ensured that the fuel cell system 100 is compatible with a variety of applications, while consistently using the fuel cell unit 90 as a common unit. It will particularly be appreciated that the fuel cell system 100 according to the present invention is not only capable of supplying electric power to a target of power supply such as the notebook PC 500 via the power cable 44 but also capable of being used as a charger for a secondary battery by inserting a secondary battery in a secondary battery slot 46 provided in the controller 40 to support a secondary battery.

EXAMPLE 1

Figure 5:
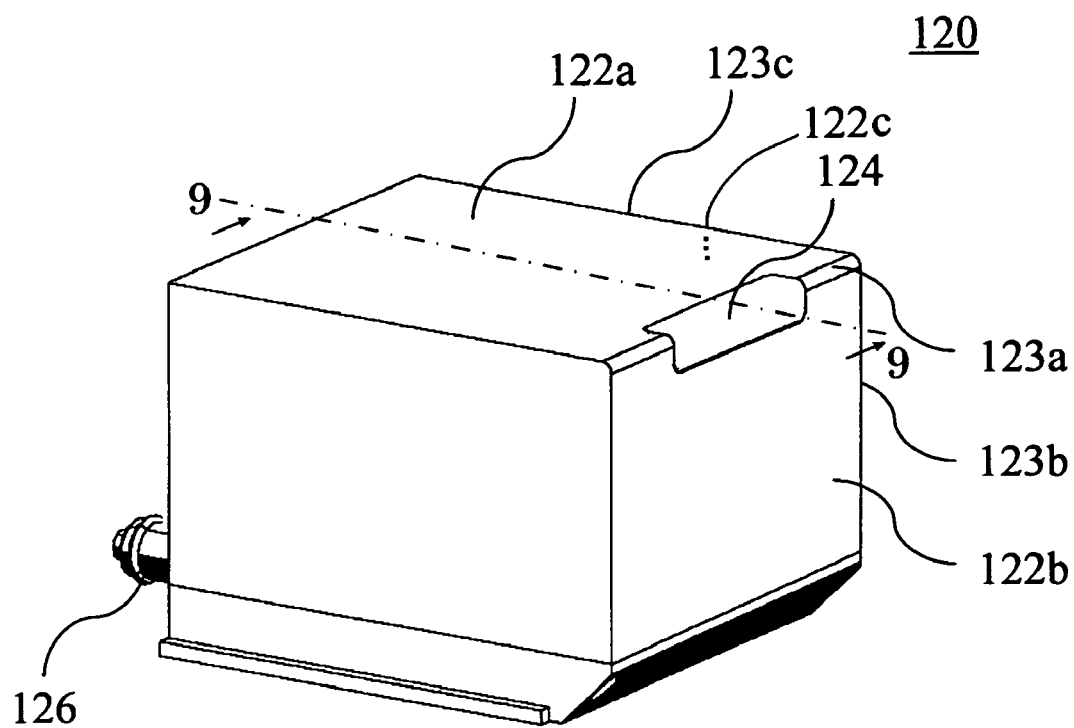
FIG. 5 is a front perspective view showing the appearance of a fuel cell tank according to one example of practicing the present invention.
Figure 6:
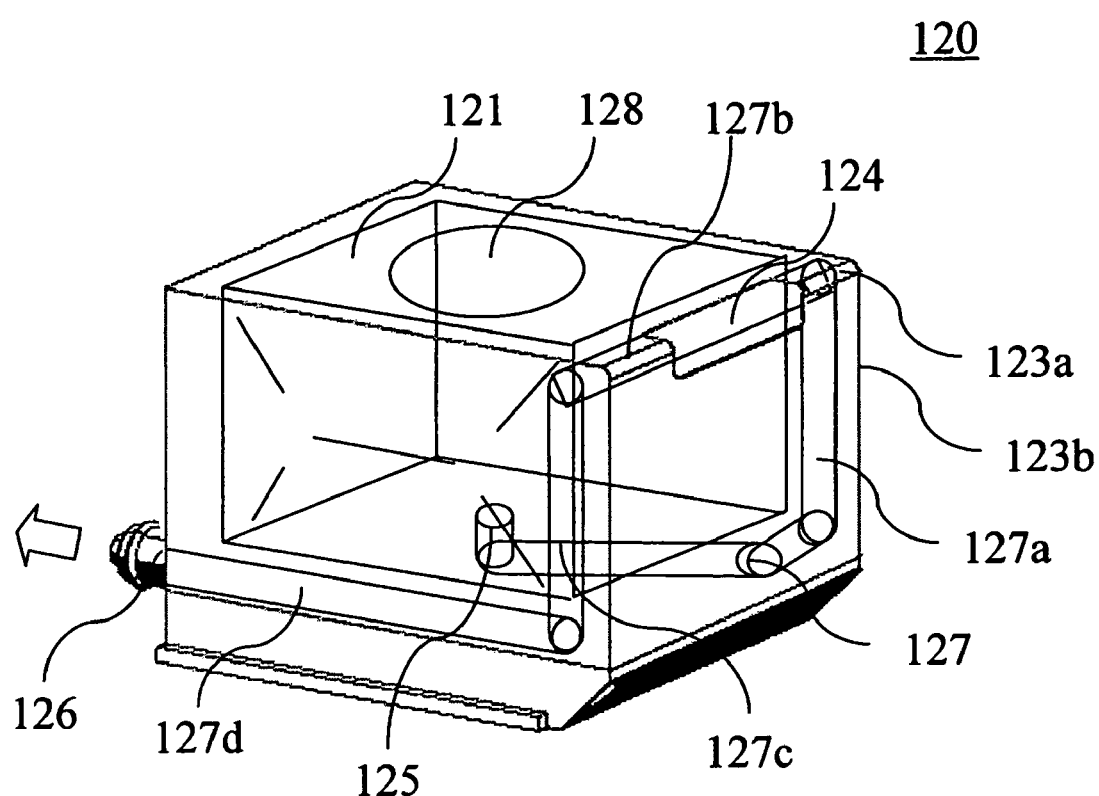
FIG. 6 is a front perspective view schematically showing the structure of the fuel cell tank according to one example of practicing the present invention.

A detailed description of the structure of a methanol tank 120 according to a first example of carrying out the embodiment of the present invention will now be given, with reference to FIGS. 5 and 6. FIG. 5 is a perspective view showing the appearance of the methanol tank 120. FIG. 6 is a perspective view schematically showing the internal structure of the methanol tank 120.

As shown in FIG. 5, a remaining indicator window 124 is provided at a side 123*a* which is a line of intersection between an upper surface 122*a* and a lateral surface 122*b* of the methanol tank 120. The remaining indicator window 124 provides a means to visually alert a user that the remaining quantity of highly-concentrated methanol water solution or pure methanol in the methanol tank 120 is relatively small. The remaining indicator window 124 may be provided at a side 123*b* where the lateral surface 122*b* and a back surface 122*c* intersect or a side 123*c* where the back surface 122*c* and the flat surface 122*a* intersect, instead of the side 123*a*. If we assume a situation where the fuel cell system 100 is attached to the notebook PC 500 for use, as shown in FIG. 3, it is most preferable to provide the remaining indicator window 124 in the side 123*a*.

As shown in FIG. 6, the methanol tank 120 accommodates a pack 121 which is of practically the same dimensions as the interior of the methanol tank 120. The pack 121 is filled with highly-concentrated methanol water solution or pure methanol. A methanol outlet 125 is provided on the bottom of the pack 121. An outlet pipe 127 connects the methanol outlet 125 to a joint 126. The joint 126 is a connection port that connects the methanol tank 120 to the fuel cell system 100. The joint 126 secures the connection between the methanol tank 120 and the fuel cell system 100 and is also provided with a leakage prevention mechanism for preventing leakage of highly-concentrated methanol water solution or pure methanol from the joint 126. The outlet pipe 127 is a transparent pipe made of silicon rubber. The outlet pipe 127 extends upward (127*a*) along the side 123*b* from the methanol outlet 125 on the bottom of the pack 121. The outlet pipe 127 is provided along the side 123*a* (127*b*)so as to ensure that an interface between liquid phase and gas phase in the outlet pipe 127 is observable through the remaining indicator window 124. The outlet pipe 127 is joined (127*c*, 127*d*) to the joint 126 provided in the lower part of the methanol tank 120.

In addition to highly-concentrated methanol water solution or pure methanol, inactive gas 128 such as nitrogen or argon of 1-3% by volume of the full capacity of the pack 121 is introduced into the pack 121. The inactive gas 128 flows into the outlet pipe 127 via the methanol outlet 125 when highly-concentrated methanol water solution or pure methanol in the pack 121 is exhausted.

EXAMPLE 2

Figure 7:
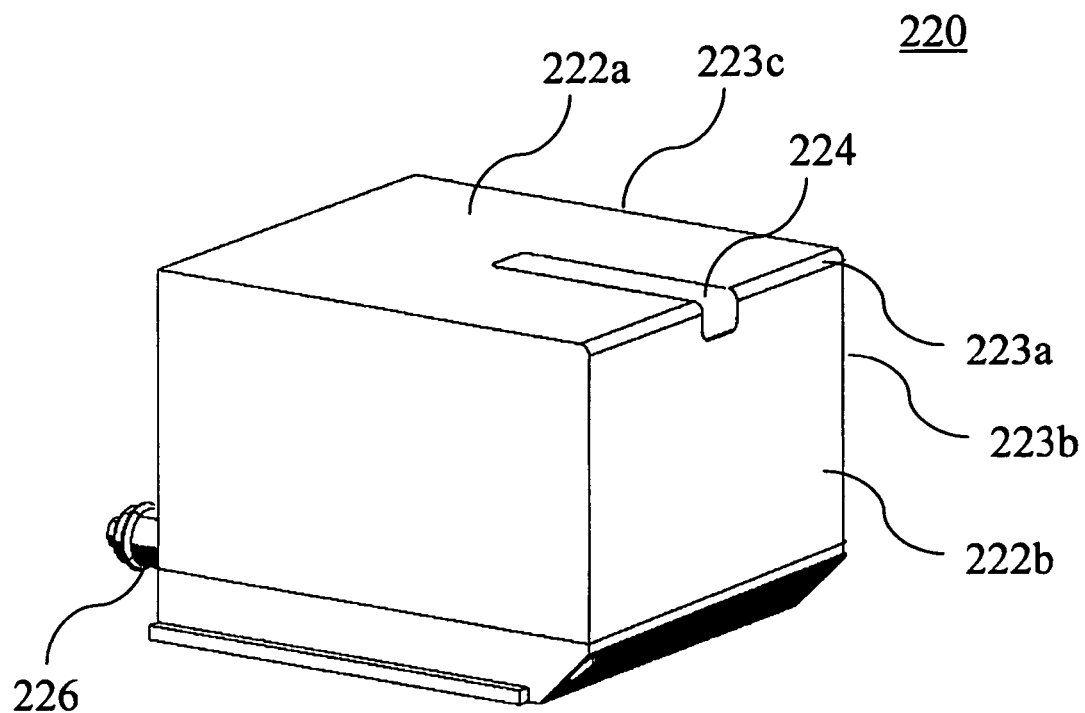
FIG. 7 is a front perspective view showing the appearance of a fuel cell tank according to another example of practicing the present invention.
Figure 8:
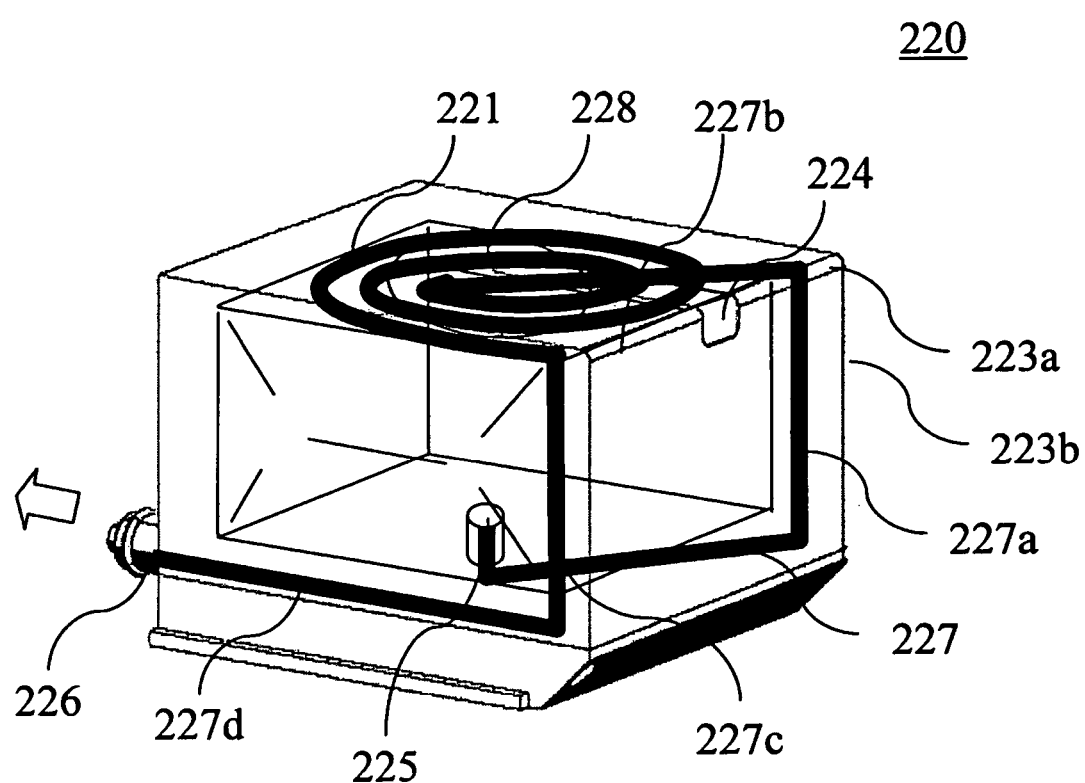
FIG. 8 is a front perspective view schematically showing the structure of the fuel cell tank according to the example of FIG. 7.

A detailed description of the structure of a methanol tank 220 according to a second example of carrying out the embodiment of the present invention will now be given, with reference to FIGS. 7 and 8. FIG. 7 is a perspective view showing the appearance the methanol tank 220. FIG. 8 is a perspective view schematically showing the internal structure of the methanol tank 220.

As shown in FIG. 7, a remaining indicator window 224 is provided to extend from a side 223*a* to an upper surface 222*a* of the methanol tank 220, the side 223*a* being a line of intersection between the upper surface 222*a* and a lateral surface 222*b* of the methanol tank 220. The remaining indicator window 224 provides a means to visually alert a user that the remaining quantity of highly-concentrated methanol water solution or pure methanol in the methanol tank 220 is relatively small.

As shown in FIG. 7, the methanol tank 220 accommodates a pack 221 which is of practically the same dimensions as the interior of the methanol tank 220. The pack 221 is filled with highly-concentrated methanol water solution or pure methanol. A methanol outlet 225 is provided on the bottom of the pack 221. An outlet pipe 227 connects the methanol outlet 225 to a joint 226. Similarly to the first example of carrying out the embodiment, the joint 226 is a connection port that connects the methanol tank 220 to the fuel cell system 100. The joint 226 secures the connection between the methanol tank 220 and the fuel cell system 100 and is provided with a leakage prevention mechanism for preventing leakage of highly-concentrated methanol water solution or pure methanol from the joint 226.

Similarly to the first example of practicing the embodiment, in addition to highly-concentrated methanol water solution or pure methanol, inactive gas 228 such as nitrogen or argon of 1-3% by volume of the full capacity of the pack 221 is introduced into the pack 221. The inactive gas 228 flows into the outlet pipe 227 via the methanol outlet 225 when highly-concentrated methanol water solution or pure methanol in the pack 221 is exhausted. Similarly to the first example of practicing the embodiment, the outlet pipe 227 is a transparent pipe made of silicon rubber. The outlet pipe 227 extends upward along the side 223*b* from the methanol outlet 225 on the bottom of the pack 221 (227*a*). The outlet pipe 227 is joined to the joint 226 provided in the lower part of the methanol tank 220 (227*c*, 227*d*).

A difference from the first example of carrying out the embodiment is that, the outlet pipe portion 227*b* is provided in the upper part of the pack 221 so as to form a spiral so that an interface between liquid phase and gas phase in the outlet pipe 227 is observable through the indicator window 224 earlier than in the first example. As the remaining quantity of highly-concentrated methanol water solution or pure methanol is decreased, bubbles travel outward in the spiral, indicating that highly-concentrated water solution or pure methanol in the methanol tank 220 is running out.

Figure 9:
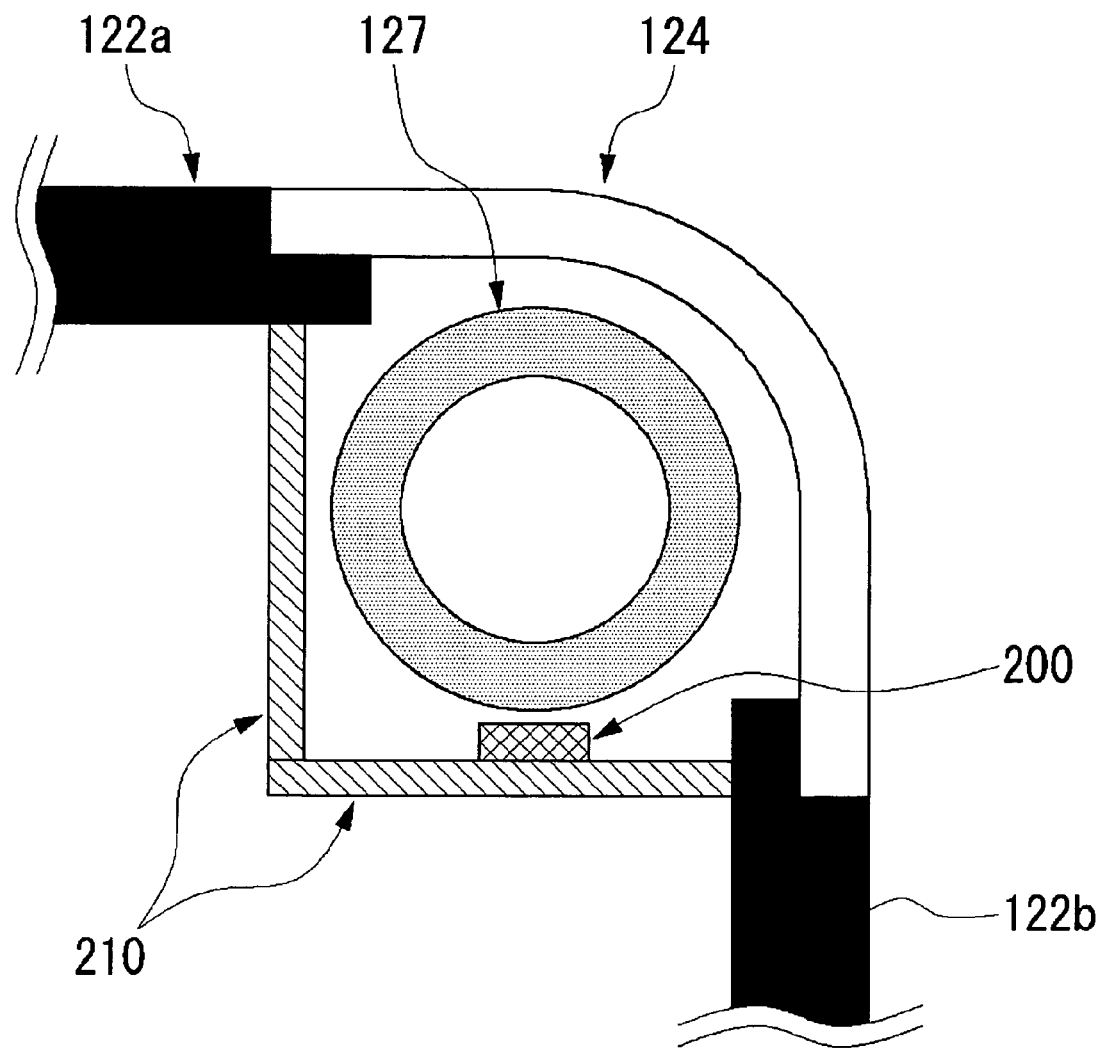
FIG. 9 is a cross sectional view taken along the line 9-9 of FIG. 5.

First Specific Embodiment for Improvement of Viewability of Fuel Remaining Quantity FIG. 9 is cross sectional view of essential parts taken along the line 9-9 of FIG. 5. The outlet pipe 127 is viewable through the remaining indicator window 124 made of transparent resin or the like.

The outlet pipe 127 has a tubular or cylindrical structure. Alternatively, the cross section of the pipe may be elliptical. It is preferable that the outlet pipe 127 have a predetermined refractive index as well as having transparency, resistance to chemicals and water repellency. In this respect, the outlet pipe 127 is preferably made of a material such as silicon rubber, fluoropolymer resin or fluororubber. It is preferable that the refractive index of the outlet pipe 127 be approximately 1.0. The refractive index within the range of +10% of the refractive index of liquid flowing through the outlet pipe 127 is tolerable. If the outlet pipe 127 is thin, refraction in the outlet pipe 127 less affects viewability. Preferably, the outlet pipe 127 is sufficiently rigid not to yield to interior pressure (negative pressure) occurring when the liquid is drained.

An indicator plate 200 for improving viewability of liquid or gas flowing through the outlet pipe 127 is provided at a position opposite to the remaining indicator window 124, across the outlet pipe 127. A color or a pattern or a combination thereof is applied to the surface of the indicator plate 200.

Reflector plates 210 are provided in the neighborhood of the outlet pipe 127. The reflector plates 210 may be made of any reflective material. For example, stainless film, aluminum foil or resin mirror may be used to form the reflector plates 210. Ambient light is collected by the reflector plates 210 so that the interior of the outlet pipe 127 is illuminated. With this, viewability of liquid and gas flowing through the outlet pipe 127 is improved so that differentiation between liquid and gas is facilitated.

Figure 10A:
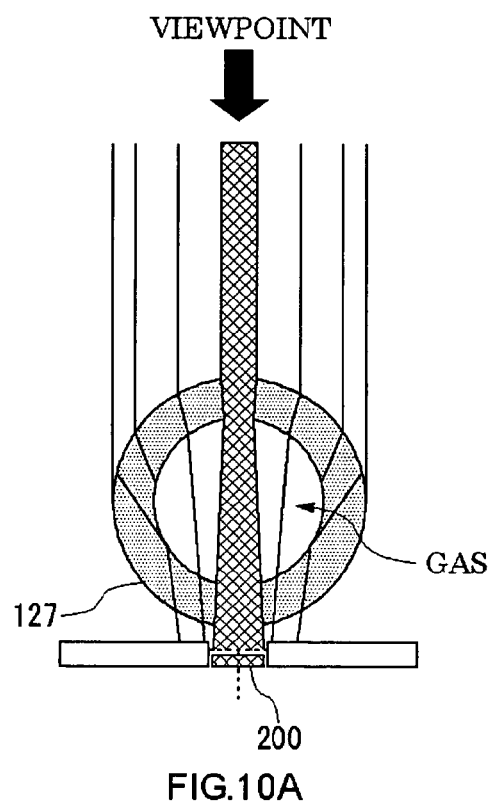
FIG. 10A is a schematic view showing an optical path in the cross section of an outlet pipe filled with gas.
Figure 10B:
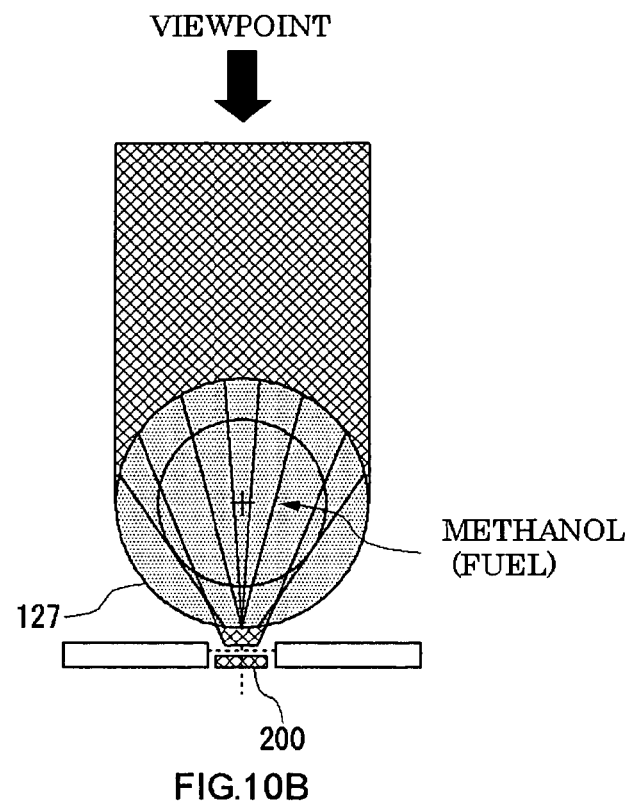
FIG. 10B is a schematic view showing an optical path in the cross section of the outlet pipe filled with liquid.

FIG. 10A is a schematic view showing an optical path in the cross section of the outlet pipe 127 filled with gas. FIG. 10B is a schematic view showing an optical path in the cross section of the outlet pipe 127 filled with liquid. Assuming that refraction in the outlet pipe 127 is negligible, light radiated by the indicator plate 200 travels practically straight through the outlet pipe 127 when the outlet pipe 127 (refractive index=1) is filled with gas. Therefore, the indicator plate 200 practically in real size is viewable through the outlet pipe 127. If the outlet pipe 127 is filled with liquid, e.g. methanol with a refractive index of 1.33, light radiated by the indicator plate 200 is refracted by the outlet pipe 127 so that an enlarged image is viewed. This allows an enlarged image of the indicator plate 200 to be viewed through the outlet pipe 127. By taking advantage of this phenomenon, liquid and gas flowing through the outlet pipe 127 can be easily distinguished from each other by applying a color or pattern that lets the indicator plate 200 to stand out from the background.

Figure 11:
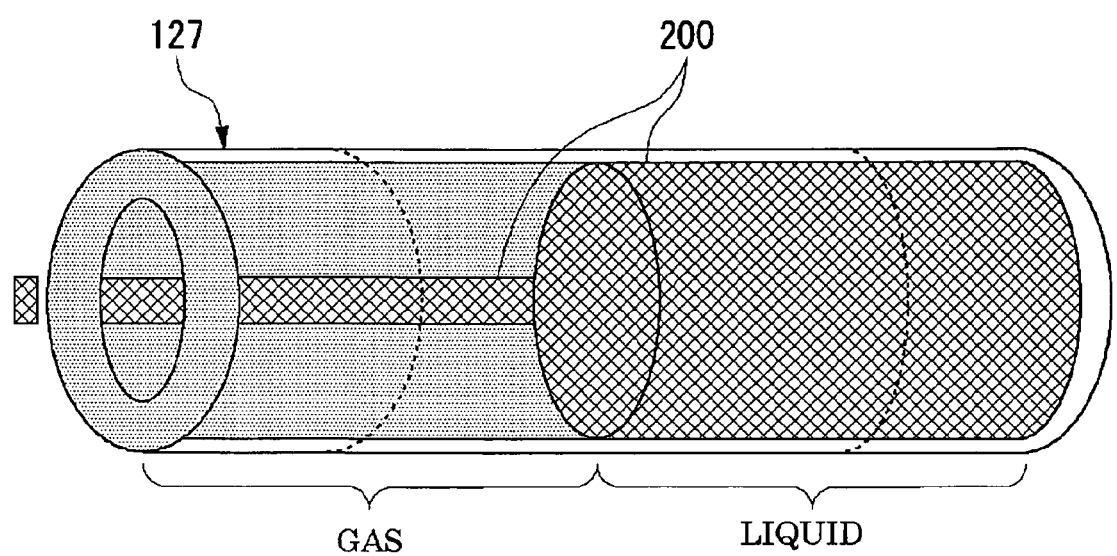
FIG. 11 is a schematic view showing an interface between liquid and gas in the outlet pipe as viewed through a remaining indicator window.

FIG. 11 is a schematic view showing an interface between liquid and gas in the outlet pipe 127 as viewed through the remaining indicator window 124. As shown in FIG. 11, the apparent size of the indicator plate 200 as viewed through the outlet pipe 127 differs significantly in the liquid portion and in the gas portion. This demonstrates that, by letting the color or pattern of the indicator plate 200 to stand out from the background, it is easy to know whether there is liquid or gas in the outlet pipe 127, even if the liquid or gas inside the outlet pipe 127 is not directly viewable.

Figures 12A, 12B:
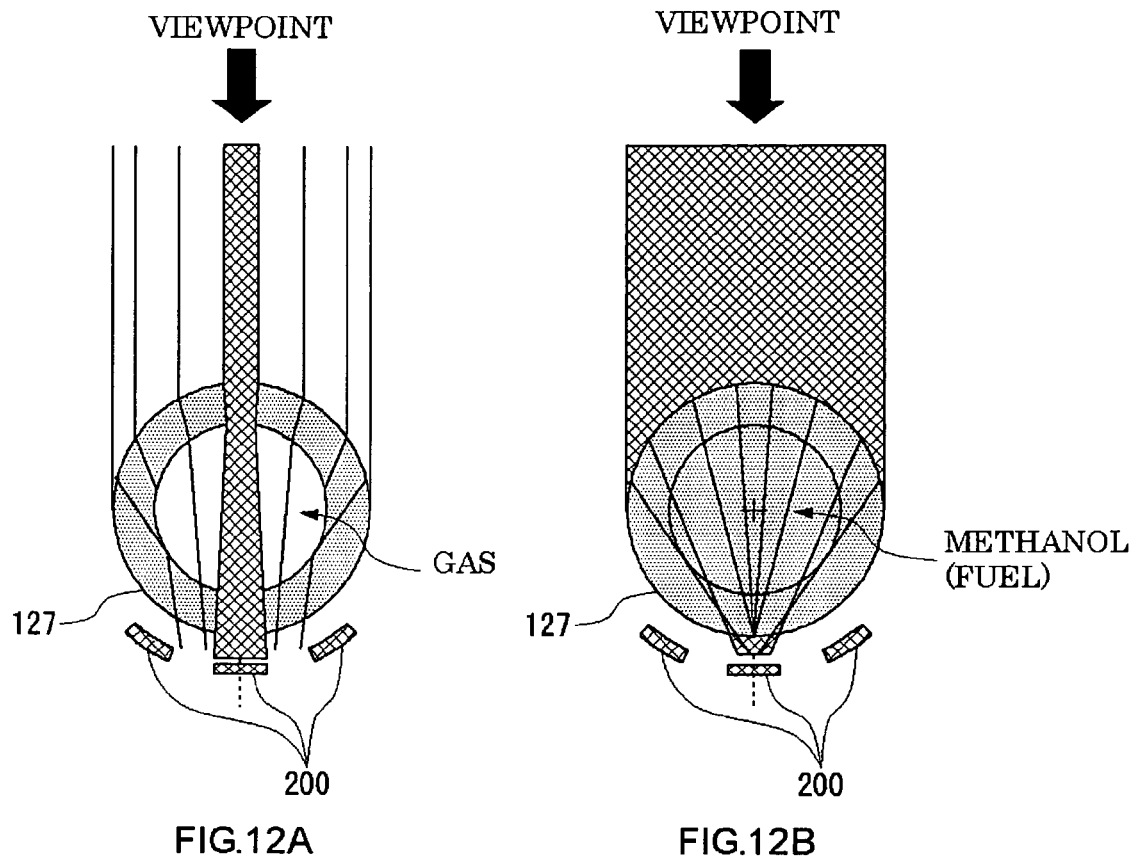
FIGS. 12A-12C show a second specific embodiment for improvement of viewability of remaining fuel quantity, where
Figure 12C:
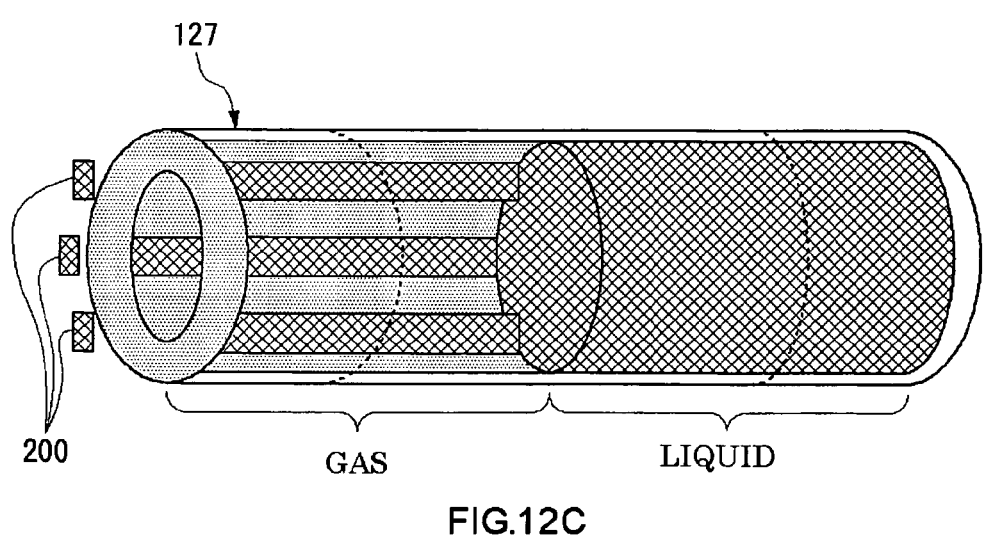

Second Specific Embodiment for Improvement of Viewability of Remaining Fuel Quantity As shown in FIG. 12, in this specific embodiment, multiple indicator plates 200 are disposed at predetermined intervals opposite to the remaining indicator window 124, across the outlet pipe 127. With this, the likelihood of at least one of the indicator plates 200 being located at the back of the outlet pipe 127 is increased when the outlet pipe 127 is viewed through the remaining indicator window 124. As a result, a more extensive viewing range is ensured in which it is possible to know whether liquid is in the outlet pipe 127.

Third Specific Embodiment for Improvement of Viewability of Fuel Remaining Quantity As shown in FIG. 13, in this specific embodiment, an alert color is applied to an area 201 in the indicator plate 200 which area becomes viewable only when gas is flowing through the outlet pipe 127. For example, the alert color may be a kind of red or yellow. This makes the apparent color of the output pipe 127 turn into an alert color while gas is flowing through the output pipe 127, allowing immediate visual confirmation that fuel is running out.

Figures 14A, 14B:
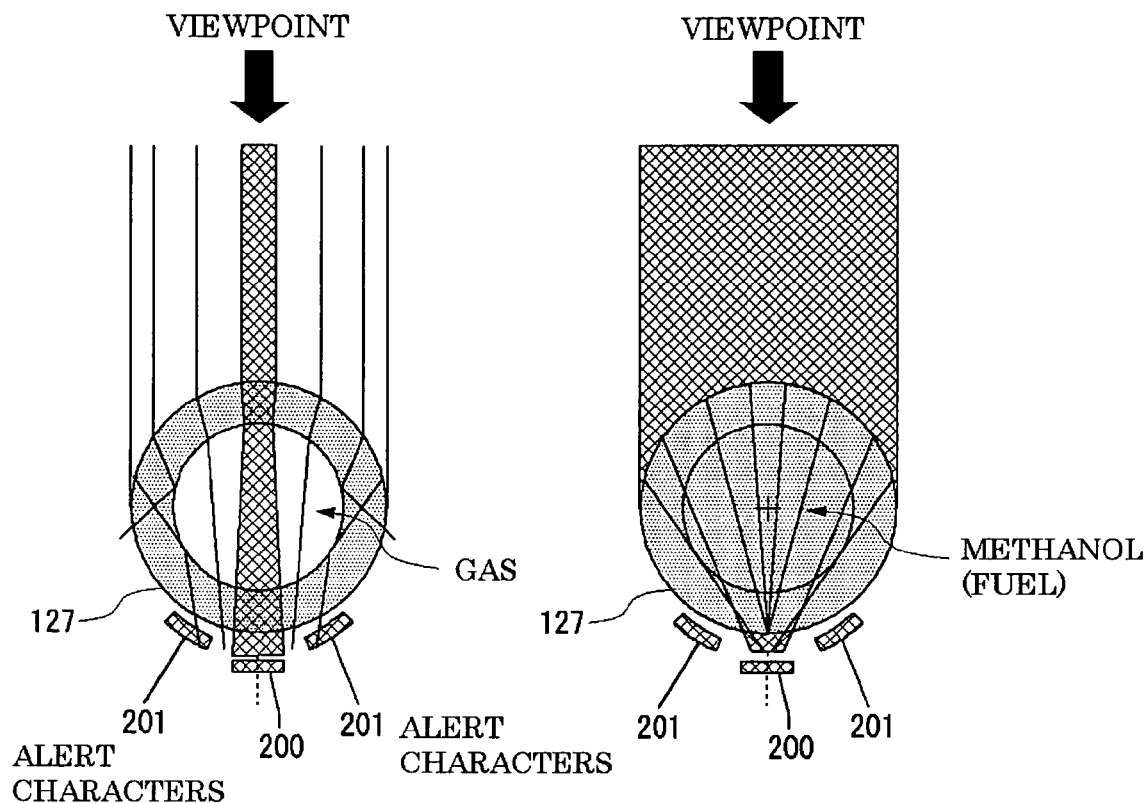
FIGS. 14A-14C show a fourth specific embodiment for improvement of viewability of remaining fuel quantity, where
Figure 14C:
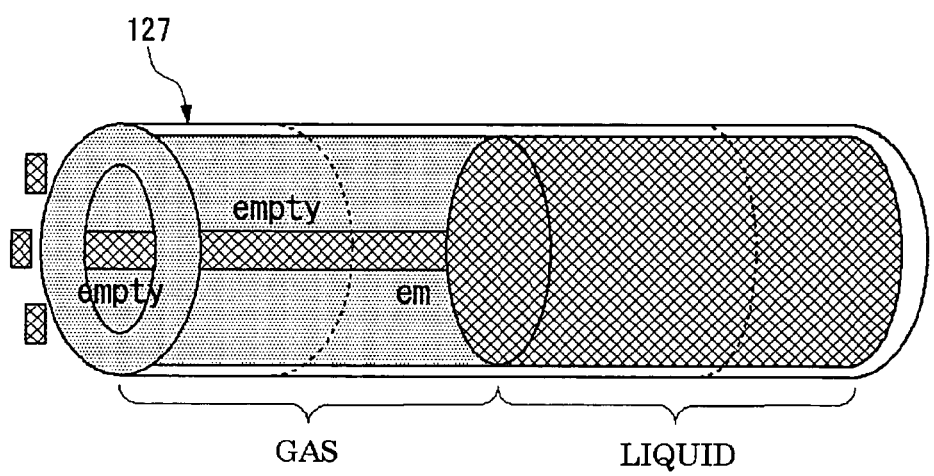

Fourth Specific Embodiment for Improvement of Viewability of Fuel Remaining Quantity As shown in FIG. 14, in this specific embodiment, character information indicating that liquid is running out is applied to an area 201 of the indicator plate 200 that becomes viewable only when gas is flowing through the outlet pipe 127. Any character information may be employed. Character strings such as "fuel running out", "replace cartridge" or "empty" may be used. By ensuring that character information indicating that liquid is running out is clearly viewable through the outlet pipe 127 when gas is flowing through the outlet pipe 127, users can know that fuel is running out more properly.

Patterns or pictures that remind one of the fact that liquid is running out may be used instead of the character information indicating that fuel is running out.

Figure 15:
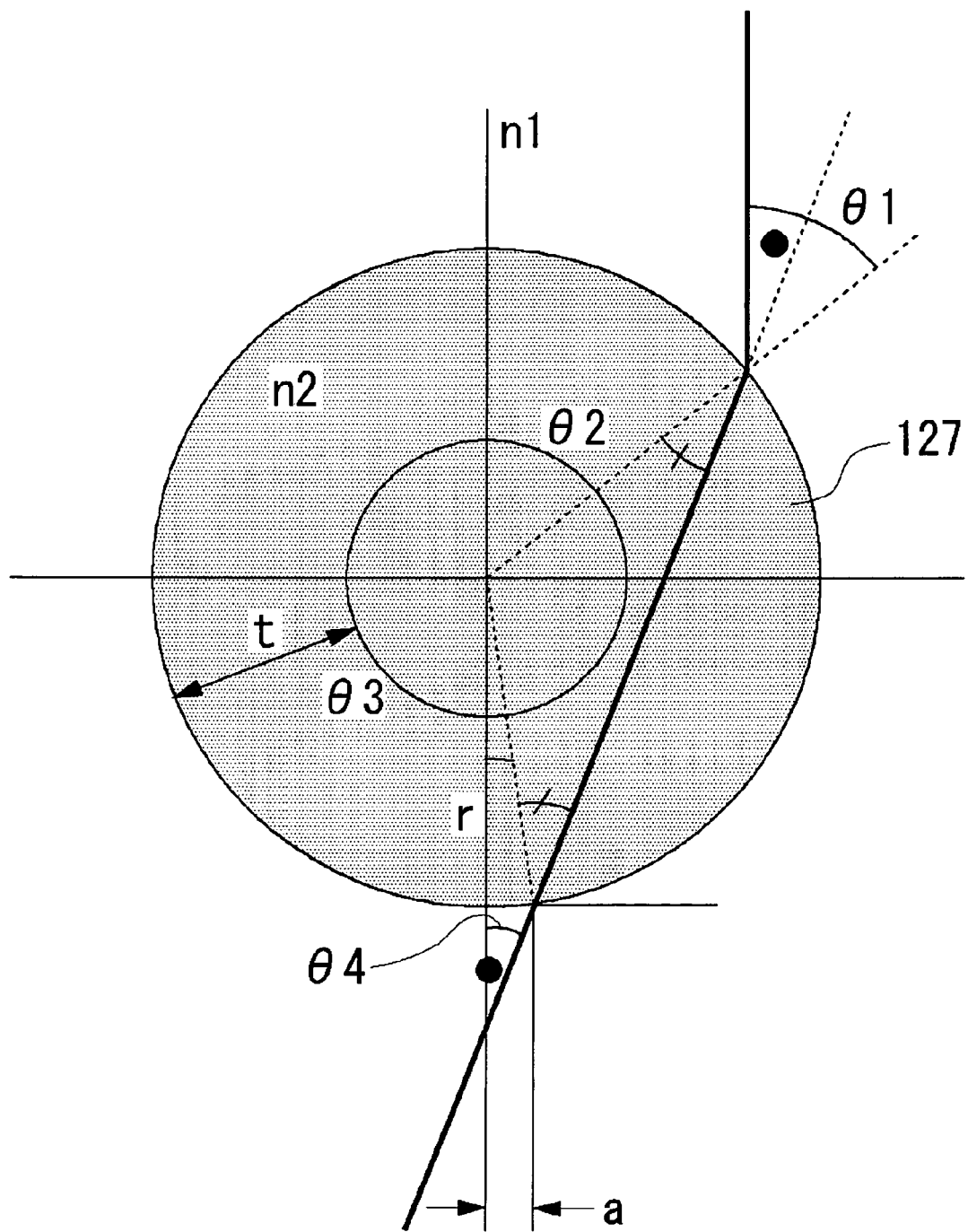
FIG. 15 is a detailed schematic view showing an optical path in the cross section of an outlet pipe filled with liquid.

FIG. 15 is a detailed schematic view showing an optical path in the cross section of the outlet pipe 127 filled with liquid. If the outlet pipe 127 is filled with liquid, the condition in which the image of the indicator plate, as viewed through the outlet pipe 127, is enlarged to match the entirety of the inner diameter of the outlet pipe 127 is given by the following expression.

$n1/n2 = \sin\theta1/\sin\theta2$ $\theta2 = \sin^{-1}(\sin\theta1 \cdot n2/n1)$ $a = r \cdot \sin\theta3$ where n1 and n2 indicate the refractive index of air (=1) and the refractive index of liquid (=1.33 in the case of methanol), respectively. The refractive index of the outlet pipe 127 is equal to that of liquid. θ1 and θ2 denote angle of incidence and angle of refraction, respectively. θ3 denotes an angle formed by light and a line connecting the outlet pipe 127 and the end of the indicator plate. r denotes the outer diameter of the outlet pipe 127. "a" denotes half the width of the indicator plate. The following relation holds between θ1, θ2, θ3 and θ4.

$\theta4 = \theta1 - \theta2$ $\theta2 = \theta3 + \theta4$ $\theta3 = (2 \times \theta2) - \theta1$ The expression shows that, if the width of the indicator plate is larger than $2r \cdot \sin\theta3$, the image of the indicator plate as viewed through the outlet pipe 127 is enlarged to match the entirety of the inner diameter of the outlet pipe 127.

It will be appreciated that the present invention is not only applicable to fuel tanks for supplying fuel to DMFCs that use methanol as fuel but also to fuel tanks for supplying fuel to any fuel cell systems that use liquid fuel.

What is claimed is:

1. A fuel cell system comprising:
    a fuel cell assembly which includes a fuel cell provided with an anode supplied with a liquid fuel and a cathode supplied with an oxidant;
    a liquid tank is detachably provided in the fuel cell assembly; and
    a fuel supply unit for supplying the liquid fuel from the liquid tank to the anode,
    the liquid tank including:

a first container;

a second container provided in the first container to contain liquid and gas, the liquid being the liquid fuel to be supplied to the fuel cell;

an outlet which is provided in the first container and discharges the liquid outside the first container;

a connecting pipe which connects the outlet to the second container; and a viewer provided to make the interior of the connecting pipe viewable, wherein the connecting pipe is made of a transparent material, a guide object is provided opposite to the viewer across the connecting pipe so as to improve viewability of the interior of the connecting pipe, a size of the guide object as viewed through the connecting pipe differs depending on whether the liquid is flowing through the connecting pipe or the gas is flowing through the connecting pipe, due to a difference in associated refractive indexes inside the connecting pipe, and an alert color is applied to an area in the guide object that becomes viewable only when the gas is flowing through the connecting pipe.

2. The fuel cell system according to claim 1, comprising:
a fuel cell unit which includes the fuel cell assembly and the liquid tank; and
a controller detachably provided in the fuel cell unit, wherein the controller is configured for a particular electronic appliance selected from a plurality of electronic appliances so that power is selectively supplied to the selected electronic appliances.

3. The fuel cell system according to claim 1, further comprising a seat on which a particular electronic appliance selected from the electronic appliances of different shapes is selectively mounted.

4. The fuel cell system according to claim 1, further comprising a secondary battery slot which supports a secondary battery, wherein the fuel cell system is capable of charging the secondary battery.

5. The fuel cell system according to claim 1, wherein the connecting pipe at least comprises:
a liquid outlet which is joined to the second container and drains the liquid from the second container; and
a light permeable portion provided adjacent to the viewer and allowing the interior of the connecting pipe to be viewable, wherein
the liquid tank is installed such that the liquid outlet is located in the lower part of the liquid tank and the light permeable portion is provided in the upper part of the liquid tank, in the direction of the gravitational force.

6. The fuel cell system according to claim 1, wherein a plurality of guide objects are provided at predetermined intervals around the circumference of the connecting pipe.

7. The fuel cell system according to claim 1, wherein the liquid tank is installed such that the outlet is located in the lower part of the liquid tank in the direction of the gravitational force.

8. The fuel cell system according to claim 1, wherein the gas is an inactive gas.

9. The fuel cell system according to claim 1, wherein the liquid is alcohol.

10. A fuel cell system comprising:
a fuel cell assembly which includes a fuel cell provided with an anode supplied with a liquid fuel and a cathode supplied with an oxidant;
a liquid tank is detachably provided in the fuel cell assembly; and
a fuel supply unit for supplying the liquid fuel from the liquid tank to the anode,
the liquid tank including:
a first container;
a second container provided in the first container to contain liquid and gas, the liquid being the liquid fuel to be supplied to the fuel cell;
an outlet which is provided in the first container and discharges the liquid outside the first container;
a connecting pipe which connects the outlet to the second container; and
a viewer provided to make the interior of the connecting pipe viewable, wherein
the connecting pipe is made of a transparent material,
a guide object is provided opposite to the viewer across the connecting pipe so as to improve viewability of the interior of the connecting pipe,
a size of the guide object as viewed through the connecting pipe differs depending on whether the liquid is flowing through the connecting pipe or the gas is flowing through the connecting pipe, due to a difference in associated refractive indexes inside the connecting pipe, and
character information indicating that the liquid in the second container is exhausted is applied to an area in the guide object that becomes viewable only when the gas is flowing through the connecting pipe.

11. The fuel cell system according to claim 10, comprising:
a fuel cell unit which includes the fuel cell assembly and the liquid tank; and
a controller detachably provided in the fuel cell unit, wherein the controller is configured for a particular electronic appliance selected from a plurality of electronic appliances so that power is selectively supplied to the selected electronic appliances.

12. The fuel cell system according to claim 10, further comprising a seat on which a particular electronic appliance selected from the electronic appliances of different shapes is selectively mounted.

13. The fuel cell system according to claim 10, further comprising a secondary battery slot which supports a secondary battery, wherein the fuel cell system is capable of charging the secondary battery.

14. The fuel cell system according to claim 10, wherein the connecting pipe at least comprises:
a liquid outlet which is joined to the second container and drains the liquid from the second container; and
a light permeable portion provided adjacent to the viewer and allowing the interior of the connecting pipe to be viewable, wherein
the liquid tank is installed such that the liquid outlet is located in the lower part of the liquid tank and the light permeable portion is provided in the upper part of the liquid tank, in the direction of the gravitational force.

15. The fuel cell system according to claim 10, wherein a plurality of guide objects are provided at predetermined intervals around the circumference of the connecting pipe.

16. The fuel cell system according to claim 10, wherein the liquid tank is installed such that the outlet is located in the lower part of the liquid tank in the direction of the gravitational force.

17. The fuel cell system according to claim 10, wherein the gas is an inactive gas.

18. The fuel cell system according to claim 10, wherein the liquid is alcohol.

* * * * *